Patented Jan. 4, 1927.

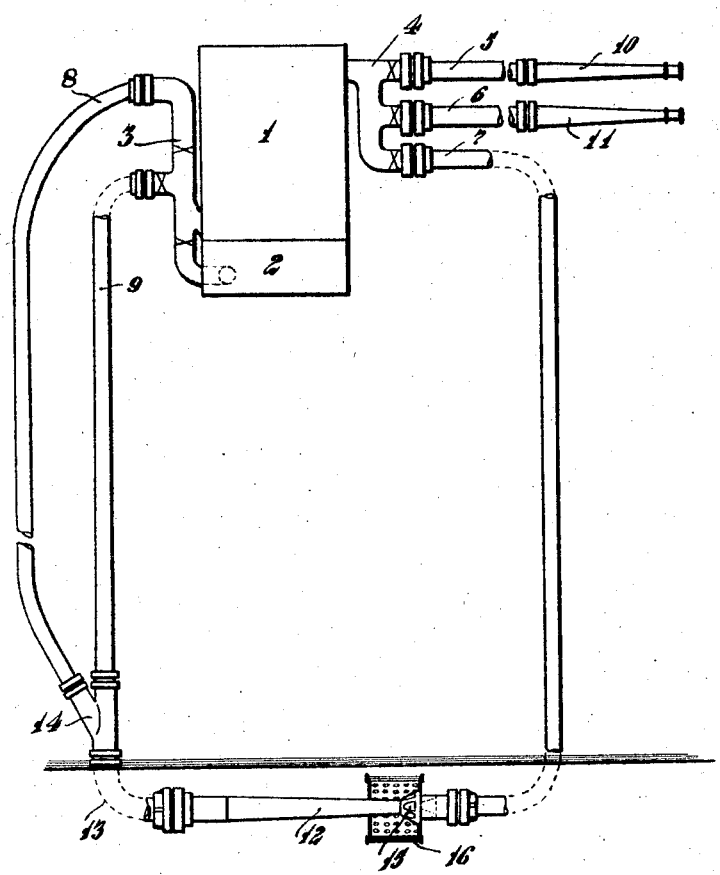

1,613,165

UNITED STATES PATENT OFFICE.

CORNELIUS GORDIJN, JR., OF AMSTERDAM, NETHERLANDS, ASSIGNOR TO NAAMLOOZE VENNOOTSCHAP KOPERGIETERIJ, APPENDAGE- EN POMPEN-FABRIEK VAN G. DIKKERS & CO., OF HENGELO (O.), NETHERLANDS.

APPARATUS FOR OPERATING FIRE ENGINES.

Application filed December 10, 1924, Serial No. 755,033, and in the Netherlands December 7, 1923.

The invention relates to a method and an apparatus for operating fire-engine pumps, and more particularly for fire-engines of great capacity. The fire-engines of the type in question are at present provided with cylindrical suction pipes, having a wall thickness sufficient to withstand the atmospheric pressure arising in suction. As, owing to the heavy weight and circumference of these suction-pipes, only a relatively short length of these pipes can be carried along, fire-engines of great capacity cannot be used as a rule where the source of water is more than ten meters distant from the engine.

These difficulties are overcome by the present invention, which permits the use use of the ordinary woven or collapsible fire hose for supplying water to the pump. By means of an injector immersed in the source of water, the pressure within the hose is maintained above atmospheric, thereby preventing collapse of the hose. The injector is actuated by water under pressure conducted from the pump to the injector by one or more flexible hose.

Though in applying this invention part of the water is diverted from the nozzles, the very important advantage is obtained that the usual heavy, cylindrical suction-pipe is no longer required, and that instead thereof water may be drawn from a practically unlimited distance by the ordinary woven fire hose, of which several hundred meters may be carried along with the fire-engine.

The annexed drawing illustrates schematically by way of example an apparatus according to the invention.

In this drawing 1 is the power pump, preferably of the multistage centrifugal type, provided with a container 2, in which a quantity of priming water can be carried along. The container 2 is connected to the inlet chamber 3 and the outlet chamber 4, to which latter the delivery hose 5, 6 and 7 are connected, while the hose 8 and 9 are connected to the inlet chamber 3. Nozzles 10 and 11 are connected to the delivery-hose 5 and 6; the third delivery hose 7 serves for feeding water to an injector 12, the outlet of which is connected to a pipe 13, coupled by means of a three-way coupling 14 to the hose 8 and 9, which in turn are connected to the inlet chamber 3. Instead of the two supply hose shown, a greater or less number may be used. The injector 12 may be of any suitable construction. Openings 15 are provided at its inlet, which latter is surrounded by a strainer 16, which prevents mud or the like from being drawn into the system.

The operation is as follows:

After connecting the injector to hose 7 and pipe 13, the injector is immersed in the source of water.

The pump 1 is then started, and the priming water from container 2 is forced through hose 7 to the injector. The injector lifts the water from the source to the pump, from which it is forced to the nozzles, a portion being diverted, through hose 7, back to the injector to actuate it.

I claim:

1. In combination, a portable power pump, an outlet conduit for said pump, a collapsible hose for conducting liquid to the inlet side of said pump, an injector connected to said hose for supplying liquid thereto and adapted to be removably immersed in a source of water and to maintain the pressure of liquid in said hose above the atmospheric, and a collapsible hose leading from the outlet side of said pump to said injector to supply water under pressure to actuate said injector.

2. In fire fighting apparatus, a portable pump, an outlet conduit for said pump, a collapsible hose for conducting water to the inlet side of said pump, an injector connected to said hose for supplying water thereto and adapted to be removably immersed in a container of water and to maintain the pressure of liquid in said hose above the atmospheric, a flexible conduit leading from the outlet of said pump to said injector to supply water under pressure to actuate said injector, a container for priming water connected to the inlet side of said pump, and a strainer surrounding the inlet of said injector.

In testimony whereof I affix my signature.

CORNELIUS GORDIJN, JR.